United States Patent [19]

Verrall et al.

[11] Patent Number: 5,573,704
[45] Date of Patent: Nov. 12, 1996

[54] LIQUID CRYSTAL POLYMERS

[75] Inventors: Mark A. Verrall; Simon Greenfield; David Coates, all of Poole, United Kingdom

[73] Assignee: The Secretary of State for Defence in Her Britannic Majesty's Government of the United Kingdom of Great Britain and Northern Ireland, United Kingdom

[21] Appl. No.: 347,372

[22] PCT Filed: May 19, 1993

[86] PCT No.: PCT/GB93/01016

§ 371 Date: Dec. 6, 1994

§ 102(e) Date: Dec. 6, 1994

[87] PCT Pub. No.: WO93/25632

PCT Pub. Date: Dec. 23, 1993

[30] Foreign Application Priority Data

Jun. 5, 1992 [GB] United Kingdom ........... 9212003

[51] Int. Cl.$^6$ ............ C09K 19/52; C09K 19/30; C09K 19/12; C09K 19/20

[52] U.S. Cl. ............ 252/299.01; 252/299.63; 252/299.66; 252/299.67

[58] Field of Search ........ 252/299.01, 299.63, 252/299.66, 299.67

[56] References Cited

U.S. PATENT DOCUMENTS

| | | | |
|---|---|---|---|
| 5,089,368 | 2/1992 | Kato et al. | 430/96 |
| 5,183,721 | 2/1993 | Kato et al. | 430/96 |
| 5,389,286 | 2/1995 | Tendolkar et al. | 252/299.01 |
| 5,420,223 | 5/1995 | Johnson | 528/91 |
| 5,426,009 | 6/1995 | Coates et al. | 430/20 |

Primary Examiner—C. H. Kelly
Attorney, Agent, or Firm—Nixon & Vanderhye P.C.

[57] ABSTRACT

A novel LCP material based on di-esters of itaconic acid is disclosed having general formula (I), where $R_1$ and $R_2$ may or may not be the same and have general structure (II); (a)=(b), (c), (d); p=2 to 14; q=0 or 1; r=1 or 2; s=1 or 2; X =O, $CO_2$, $O_2C$, $CH_2$; Y=$C_2H_4$, O, $CO_2$, $O_2C$; Z=CN, halogen, R, $CO_2R$, OR, $O_2CR$; wherein R=chiral or achiral; excluding X=O and X=$CH_2$ when A=phenyl, r=s=1, Y=$CO_2$, $O_2C$, q=1 and Z=CN, R, $CO_2R$, OR.

1 Claim, No Drawings

LIQUID CRYSTAL POLYMERS

This invention concerns novel liquid crystal polymer (LCP) materials and method for preparing same.

LCP's are known and are used in the electro-optical device industry, for example, in optical storage devices, in non-linear optical devices and in pyroelectric devices, see for example, GB 2146787 A and Makromol Chem, 186 2639–2647, 1985.

One known type of LCP consists of a polymeric backbone to which are attached pendant side chains which have a chemical structure that is mesogenic, i.e. that induces liquid crystalline character, these being known as side chain liquid crystal polymers. Work in this field has identified a large number of side chain structures which are suitable, see for example GB 2146787 A. For some purposes it is desirable that the LCP shows a smectic C ($S_c$) or chiral smectic C ($S_c^*$) liquid crystal phase, and a particularly preferred side chain for achieving this is one which contains a laterally fluorinated biphenyl or terphenyl system.

Liquid crystal polyacrylates are known, Polymer Communications, 24, 364–365, 1988, having a polyacrylate backbone, e.g. polymathacrylate, with pendent side chains, i.e. of general structure:

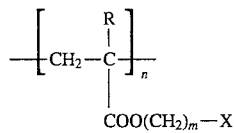

Where $(CH_2)_m$—X is the side chain and R is hydrogen or alkyl in the case of polyalkylacrylates, being methyl in polymethacrylates.

European Patent Application No. 0 357 850 A1 discusses compositions of co-polymers containing monomers based on a di-ester of itaconic acid.

According to the present invention there is provided a novel LCP material based on di-esters of itaconic acid having improved liquid crystal properties over known polyacrylates of similar structure, having a general formula I;

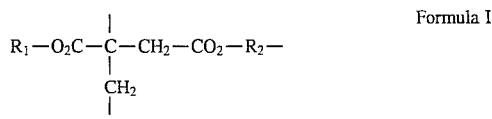

Formula I

Where $R_1$ and $R_2$ may or may not be the same and have the following general structure:

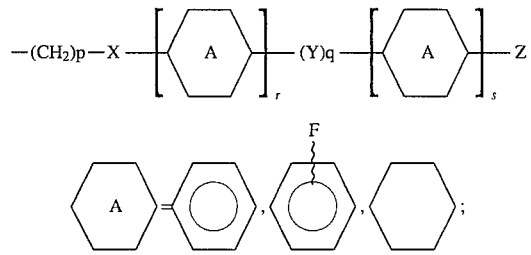

p=2 to 14;
q=0 or 1;
r=1 or 2;
s=1 or 2;
X=O, $CO_2$, $O_2C$, $CH_2$;
Y=$C_2H_4$, O, $CO_2$, $O_2C$;
Z=CN, halogen, R, $CO_2R$, OR, $O_2CR$; wherein R contains from 1–20 carbon atoms and may be chiral or achiral branched alkyl or chiral or achiral straight chain alkyl;
excluding X=O and X=$CH_2$ when A=phenyl, r=s=1, Y=$CO_2$, $O_2C$, q=1 and Z=CN, R, $CO_2R$, OR;
excluding X=$CO_2$, when A=phenyl, r=s=1, Y=$CO_2$, $O_2C$, q=1 and Z=OR.

The general method of preparation of LCP's of formula I is by polymerisation of a compound of general structure:

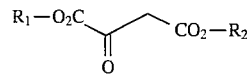

Wherein $R_1$ and $R_2$ have the general structure defined above.

EXAMPLE 1

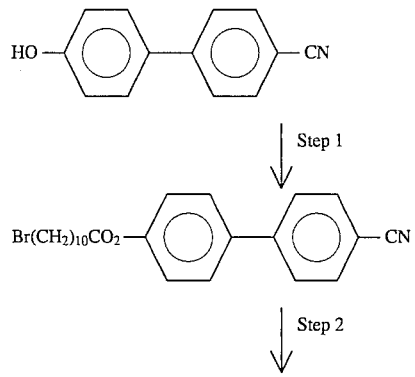

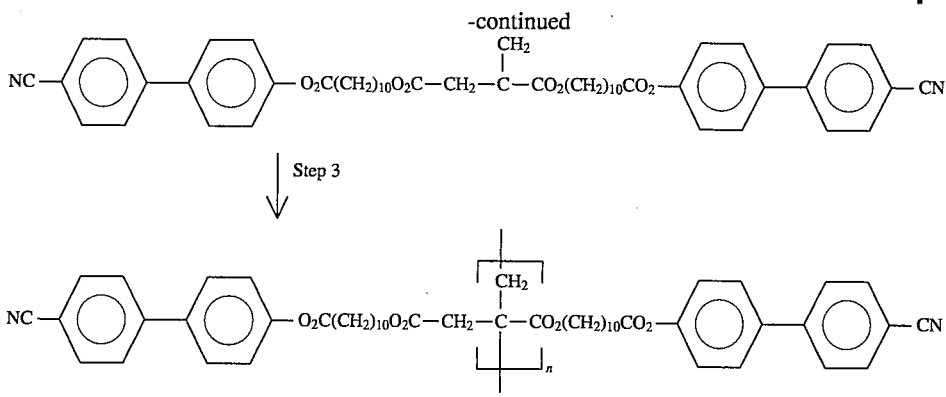

STEP 1

4-cyano-4'-hydroxybiphenyl was stirred at room temperature with 11-bromoundecanoic acid and trifluoroacetic anhydride in dichloromethane for 24 hours. Purification of the product was achieved by recrystallisation from IMS.

STEP 2

The purified product of step 1 was stirred at room temperature with itaconic acid and sodium hydride in hexamethyl phosphoramide for 24 hours. The solution was acidified and separated into ether. The product was purified by recrystallisation from IMS.

STEP 3

The itaconate monomer was stirred at 70° C. in 1,2-dichloroethane with azoisobutyronitrile as an initiator. The product was separated from the monomer by re-precipitation from DCM/IMS.

1. g of the itaconate monomer described above was polymerised to yield 0.56 g polymer with the following characteristics:

Mn=29,430 (n=35)
Mw=45,920
Mw/Mn: 1.56
Tg=40° C.
Peaks=60° C. and 94° C.
Tcl=221° C.

The above characteristics show a significant improvement when compared to a known polyacrylate of similar structure:

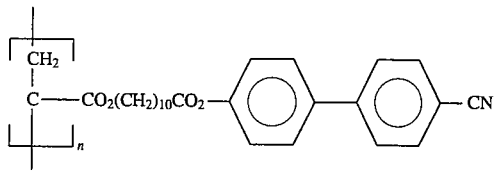

Mn=17,460 (n=40)
Mw=35,600
Mw/Mn: 2.03
Tg=29° C.
Peaks=37° C.
Tcl=150° C.

It will be appreciated that it is not intended to limit the invention to the above example only, many variations, such as might readily occur to one skilled in the art, being possible, without departing from the scope thereof as defined in the appended claims.

We claim:

1. A LCP material of the formula I:

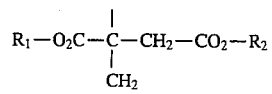

Formula I wherein $R_1$ and $R_2$ may or may not be the same and have the following structure:

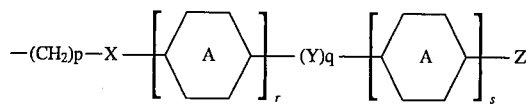

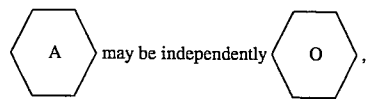

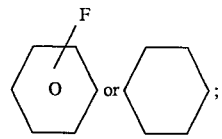

p is 2 to 14;
q is 0 or 1;
r is 1 or 2;
s is 1 or 2;
X is O, $CO_2$, $O_2C$ or $CH_2$;
Y is $C_2H_4$, O, $CO_2$ or $O_2C$;
Z is CN, halogen, R, $CO_2R$, OR or $O_2CR$, wherein R contains from 1–20 carbon atoms and may be branched or straight chain alkyl;
excluding X being O or X being $CH_2$ when A is phenyl, r and s are both 1, Y is $CO_2$ or $O_2C$, q is 1 and Z is CN, R, $CO_2R$ or OR; and excluding X being $CO_2$ when A is phenyl, r and s both being 1, Y is $CO_2$ or $O_2C$, q is 1 and Z is OR.

* * * * *